(12) United States Patent
Jiang et al.

(10) Patent No.: US 8,811,513 B2
(45) Date of Patent: Aug. 19, 2014

(54) ANTENNA SWITCHING IN A CLOSED LOOP TRANSMIT DIVERSITY SYSTEM

(75) Inventors: Yibo Jiang, San Diego, CA (US); Sharad Deepak Sambhwani, San Diego, CA (US); Jilei Hou, Carlsbad, CA (US); Jason Frank Hunzinger, Escondido, CA (US); Haitong Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 13/019,469

(22) Filed: Feb. 2, 2011

(65) Prior Publication Data

US 2012/0027112 A1 Feb. 2, 2012

Related U.S. Application Data

(60) Provisional application No. 61/302,063, filed on Feb. 5, 2010.

(51) Int. Cl.
  *H04B 7/02* (2006.01)
  *H04L 1/02* (2006.01)
  *H04B 7/04* (2006.01)
  *H04B 7/06* (2006.01)

(52) U.S. Cl.
  CPC .............. *H04B 7/061* (2013.01); *H04B 7/0404* (2013.01)
  USPC ............ 375/267; 375/347; 455/101; 370/328

(58) Field of Classification Search
  USPC .............. 370/230, 239, 431, 358, 395.4, 328; 375/130, 134, 135, 136, 149, 150, 267, 375/347; 455/91, 562.1, 101
  See application file for complete search history.

(56) References Cited

U.S. PATENT DOCUMENTS

| 5,648,955 | A  | * | 7/1997  | Jensen et al. ................... 370/252 |
| 6,728,203 | B2 | * | 4/2004  | Wang ............................. 370/210 |
| 7,116,723 | B2 | * | 10/2006 | Kim et al. ....................... 375/267 |
| 7,171,165 | B2 | * | 1/2007  | Azman et al. ................... 455/69 |
| 7,397,803 | B2 | * | 7/2008  | Love et al. ................. 370/395.4 |
| 7,720,034 | B2 | * | 5/2010  | Seo et al. ....................... 370/336 |

(Continued)

FOREIGN PATENT DOCUMENTS

| EP | 2023504 A2 | 2/2009 |
| JP | 2005533406 A | 11/2005 |

(Continued)

OTHER PUBLICATIONS

Institute for Infocomm Research (I2R) et al., "Transmit Antenna Selection Techniques for Uplink E-UTRA" Oct. 2005, 3GPP Draft, 3rd Generation Partnershipp Project (3GPP), R1-051398, vol. RAN WG1.*

(Continued)

*Primary Examiner* — Daniel Washburn
*Assistant Examiner* — Amneet Singh
(74) *Attorney, Agent, or Firm* — Darren M. Simon

(57) ABSTRACT

A method for closed loop transmit diversity that includes receiving data from user equipment (UE) that was transmitted using multiple transmit antennas, selecting a new transmit antenna for the UE, determining a new cycle period for the UE, and sending a new transmit antenna index and a testing indication based on the new cycle period to the UE.

28 Claims, 13 Drawing Sheets

(56) References Cited

U.S. PATENT DOCUMENTS

| | | | |
|---|---|---|---|
| 8,121,208 B2* | 2/2012 | Song et al. | 375/262 |
| 8,121,537 B2* | 2/2012 | Hwang et al. | 455/13.3 |
| 8,223,723 B2* | 7/2012 | Teo et al. | 370/332 |
| 2004/0116079 A1* | 6/2004 | Kim et al. | 455/103 |
| 2004/0162021 A1 | 8/2004 | Seki et al. | |
| 2005/0152314 A1* | 7/2005 | Sun et al. | 370/334 |
| 2008/0051149 A1* | 2/2008 | Mehta et al. | 455/562.1 |
| 2008/0247330 A1 | 10/2008 | Ko et al. | |
| 2009/0016312 A1* | 1/2009 | Tao et al. | 370/344 |
| 2009/0016372 A1* | 1/2009 | Tao et al. | 370/437 |
| 2009/0042615 A1* | 2/2009 | Teo et al. | 455/562.1 |
| 2009/0149139 A1 | 6/2009 | Harel et al. | |
| 2009/0274220 A1* | 11/2009 | Yun et al. | 375/244 |
| 2009/0279447 A1* | 11/2009 | Mehta et al. | 370/252 |
| 2010/0002657 A1* | 1/2010 | Teo et al. | 370/336 |
| 2010/0027496 A1* | 2/2010 | Higuchi et al. | 370/329 |
| 2010/0056074 A1 | 3/2010 | Higuchi et al. | |
| 2010/0069122 A1 | 3/2010 | Ito | |
| 2010/0103877 A1 | 4/2010 | Wang et al. | |
| 2010/0111009 A1* | 5/2010 | Pajukoski et al. | 370/329 |
| 2010/0234011 A1* | 9/2010 | Baker et al. | 455/422.1 |
| 2010/0254326 A1* | 10/2010 | Sawahashi et al. | 370/329 |
| 2011/0053527 A1* | 3/2011 | Hunzinger | 455/101 |

FOREIGN PATENT DOCUMENTS

| | | |
|---|---|---|
| JP | 2009060595 A | 3/2009 |
| WO | 03073650 A1 | 9/2003 |
| WO | 2008023330 A2 | 2/2008 |
| WO | 2008093952 A2 | 8/2008 |
| WO | 2008099780 A1 | 8/2008 |
| WO | 2009054700 A2 | 4/2009 |

OTHER PUBLICATIONS

International Search Report and Written Opinion—PCT/US2011/023822—ISA/EPO—May 24, 2011.
Taiwan Search Report—TW100104139—TIPO—Jul. 24, 2013.

* cited by examiner

ANTENNA SWITCHING IN A CLOSED LOOP TRANSMIT DIVERSITY SYSTEM

RELATED APPLICATIONS

This application is related to and claims priority from U.S. Provisional Patent Application Ser. No. 61/302,063 filed Feb. 5, 2010, for "Closed Loop Transmit Diversity Antenna Switching."

TECHNICAL FIELD

The present application pertains to communication systems for antenna switching in a closed loop transmit diversity system.

BACKGROUND

Wireless communications systems are widely deployed to provide various types of communication such as voice, packet data and so on. These systems may be based on code division multiple access (CDMA), time division multiple access (TDMA), frequency division multiple access (FDMA) or other multiple access techniques. Such systems can conform to standards such as Third-Generation Partnership Project 2 (3GPP2, or "CDMA2000"), Third-Generation Partnership (3GPP, or "W-CDMA") or Long Term Evolution ("LTE"). In the design of such communications systems, it is desirable to maximize the capacity, or the number of users the system can reliably support, given the available resources.

The apparatuses and methods of the present patent application are directed to overcoming limitations of the prior art and providing improved antenna switching in a closed loop transmit diversity system.

SUMMARY OF THE INVENTION

A method for closed loop transmit diversity is disclosed. Data from a user equipment (UE) that was transmitted using multiple transmit antennas is received. A new transmit antenna is selected for the UE. A new cycle period for the UE is determined. A new transmit antenna index and a testing indication based on the new cycle period are sent to the UE.

The selecting may include comparing channel strength metrics of multiple transmit antennas to determine a stronger transmit antenna. The selecting may further include determining the channel strength metrics by removing an effect of power control commands sent to the UE. The selecting may further include averaging the channel strength metrics over multiple slots within a frame or over multiple frames.

In one configuration, the new cycle period may be maintained at a Node B. The new cycle period may include a testing period during which the user equipment (UE) transmits using a non-selected antenna and an extended use period during which the UE transmits using the selected antenna. The new transmit antenna index and testing indication may be sent using a Fractional Dedicated Physical Channel (F-DPCH). The testing indication may indicate whether the UE should transmit a next frame using only the selected antenna or the selected antenna and a non-selected antenna. The new transmit antenna and the new cycle period may be determined at an end of a current testing period. The new transmit antenna index may be encoded using direct encoding or differential encoding.

An apparatus for antenna switching in a closed loop transmit diversity system is also disclosed. The apparatus includes a processor and memory in electronic communication with the processor. Executable instructions are stored in the memory. The instructions are executable to receive data from a user equipment (UE) that was transmitted using multiple transmit antennas. The instructions are also executable to select a new transmit antenna for the UE. The instructions are also executable to determine a new cycle period for the UE. The instructions are also executable to send a new transmit antenna index and a testing indication based on the new cycle period to the UE.

A Node B for antenna switching in a closed loop transmit diversity system is also disclosed. The Node B includes means for receiving data from a user equipment (UE) that was transmitted using multiple transmit antennas. The Node B also includes means for selecting a new transmit antenna for the UE. The Node B also includes means for determining a new cycle period for the UE. The Node B also includes means for sending a new transmit antenna index and a testing indication based on the new cycle period to the UE.

A computer-program product for antenna switching in a closed loop transmit diversity system is also disclosed. The computer-program product comprises a non-transitory computer-readable medium having instructions thereon. The instructions include code for causing a Node B to receive data from a user equipment (UE) that was transmitted using multiple transmit antennas. The instructions also include code for causing the Node B to select a new transmit antenna for the UE. The instructions also include code for causing the Node B to determine a new cycle period for the UE. The instructions also include code for causing the Node B to send a new transmit antenna index and a testing indication based on the new cycle period to the UE.

A method for switching antennas in a closed loop transmit diversity system is also disclosed. Data is transmitted on the uplink using multiple transmit antennas. Feedback data is received that includes a selected transmit antenna index and an indication about whether a next frame is a test frame. The next frame is transmitted on the uplink using one or more antennas indicated by the feedback data.

In one configuration, if the next frame is a test frame, the next frame may be transmitted using a selected transmit antenna and a non-selected transmit antenna. Alternatively, if the next frame is not a test frame, the next frame may be transmitted using only the selected transmit antenna.

An apparatus for antenna switching in a closed loop transmit diversity system is also disclosed. The apparatus includes a processor and memory in electronic communication with the processor. Executable instructions are stored in the memory. The instructions are executable to transmit data on the uplink using multiple transmit antennas. The instructions are also executable to receive feedback data that comprises a selected transmit antenna index and an indication about whether a next frame is a test frame. The instructions are also executable to transmit the next frame on the uplink using one or more antennas indicated by the feedback data.

A wireless communication device for antenna switching in a closed loop transmit diversity system is also disclosed. The wireless communication device includes means for transmitting data on the uplink using multiple transmit antennas. The wireless communication device also includes means for receiving feedback data that comprises a selected transmit antenna index and an indication about whether a next frame is a test frame. The wireless communication device also includes means for transmitting the next frame on the uplink using one or more antennas indicated by the feedback data.

A computer-program product for antenna switching in a closed loop transmit diversity system is also disclosed. The computer-program product comprises a non-transitory computer-readable medium having instructions thereon. The instructions include code for causing a wireless communication device to transmit data on the uplink using multiple transmit antennas. The computer-program product also includes code for causing the wireless communication device to receive feedback data that comprises the selected transmit antenna index and an indication about whether a next frame is a test frame. The computer-program product also includes code for causing the wireless communication device to transmit the next frame on the uplink using one or more antennas indicated by the feedback data.

In view of the above, the described features of the present invention generally relate to one or more improved systems, methods and/or apparatuses for improved uplink transmit diversity.

Further scope of the applicability of the present method and apparatus will become apparent from the following detailed description, claims and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The features, objects and advantages of the presently disclosed method and apparatus will become more apparent from the detailed description set forth below when taken in conjunction with the drawings in which like reference characters identify correspondingly throughout, and wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Figure 1:
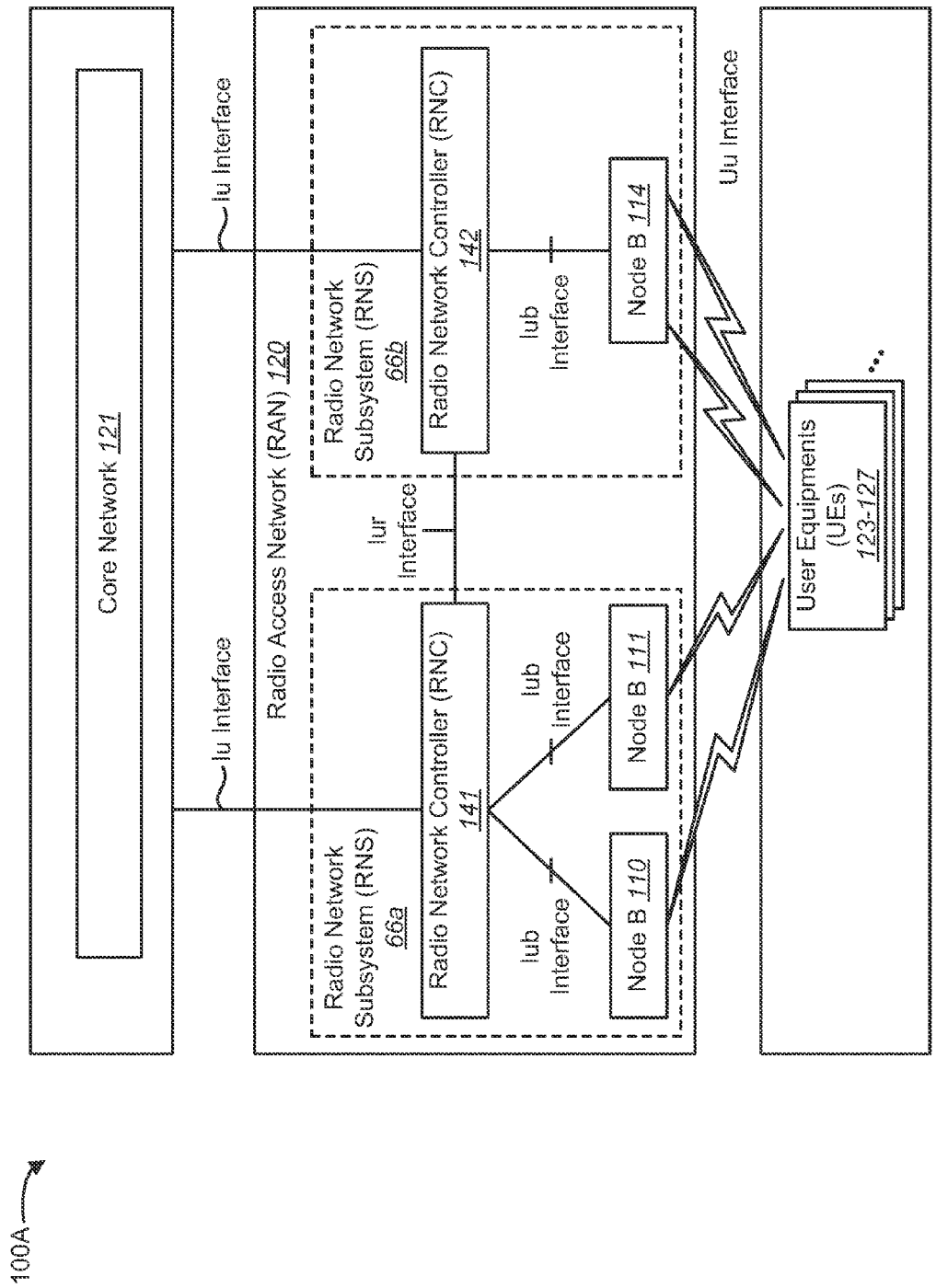
FIG. 1 is a block diagram illustrating a radio access system having two radio network subsystems along with its interfaces to the core and the user equipment.

FIG. 1 is a block diagram illustrating a radio access system 100a having two radio network subsystems along with its interfaces to the core and the user equipment. Specifically, FIGS. 1-4 illustrate a radio network operating according to Universal Mobile Telecommunications System (UMTS), in which the principles of the present disclosure may be applied. The system 100a may include Node Bs 110, 111, 114 and radio network controllers (RNCs) 141, 142. The term "Node B" refers to a wireless communication station that is installed at a fixed location and used to communicate with wireless communication devices, such as user equipments (UEs) 123-127. A Node B 110, 111, 114 may alternatively be referred to as an access point, a base station, an evolved Node B or some other similar terminology.

The radio network controllers (RNCs) 141, 142 and Node Bs 110, 111, 114 may be included as parts of a radio access network (RAN) 120, also referred to as "radio network," "RN," "access network," or "AN." The radio access network (RAN) 120 may be a UMTS Terrestrial Radio Access Network (UTRAN) 120. UTRAN 120 is a collective term for the Node Bs (or base stations) 110, 111, 114 and the control equipment for the Node Bs 110, 111, 114 (or radio network controllers (RNCs) 141, 142) it contains, which make up the UMTS radio access network (RAN) 120. The system 100a may be a third generation (3G) communications network capable of carrying both real-time circuit switched and IP-based packet switched traffic types. The UTRAN 120 provides an air interface access method for the user equipments (UEs) 123-127. Connectivity is provided between the user equipments (UEs) 123-127 and the core network 121 by the UTRAN 120. The radio access network (RAN) 120 may transport data packets between multiple user equipment (UE) devices 123-127. The Node Bs 110, 111, 114 and radio network controllers (RNCs) 141, 142 may be part of a radio network subsystem (RNS) 66a-b.

The UTRAN 120 is connected internally or externally to other functional entities by four interfaces: Iu, Uu, Iub and Iur. The UTRAN 120 is attached to a GSM core network 121 via an external interface called Iu. Radio network controller (RNC) 141-144 (shown in FIG. 2), of which 141, 142 are shown in FIG. 1, supports this interface. In addition, the RNCs 141, 142 manage the Node Bs through interfaces labeled Iub. The Iur interface connects two RNCs 141, 142 with each other. The UTRAN 120 is largely autonomous from the core network 121 since the RNCs 141, 142 are interconnected by the Iur interface. FIG. 1 discloses a communication system 100a that uses the RNCs 141, 142, the Node Bs 110, 111, 114 and the Iu and Uu interfaces. The Uu is also external and connects the Node Bs 110, 111, 114 with the UEs 123-127, while the Iub is an internal interface connecting the RNCs 141, 142 with the Node Bs 110, 111, 114.

The system 100a may be further connected to additional networks outside the radio network 120, such as a corporate intranet, the Internet or a conventional public switched telephone network as stated above, and may transport data packets between each UE 123-127 and such outside networks.

Figure 2:
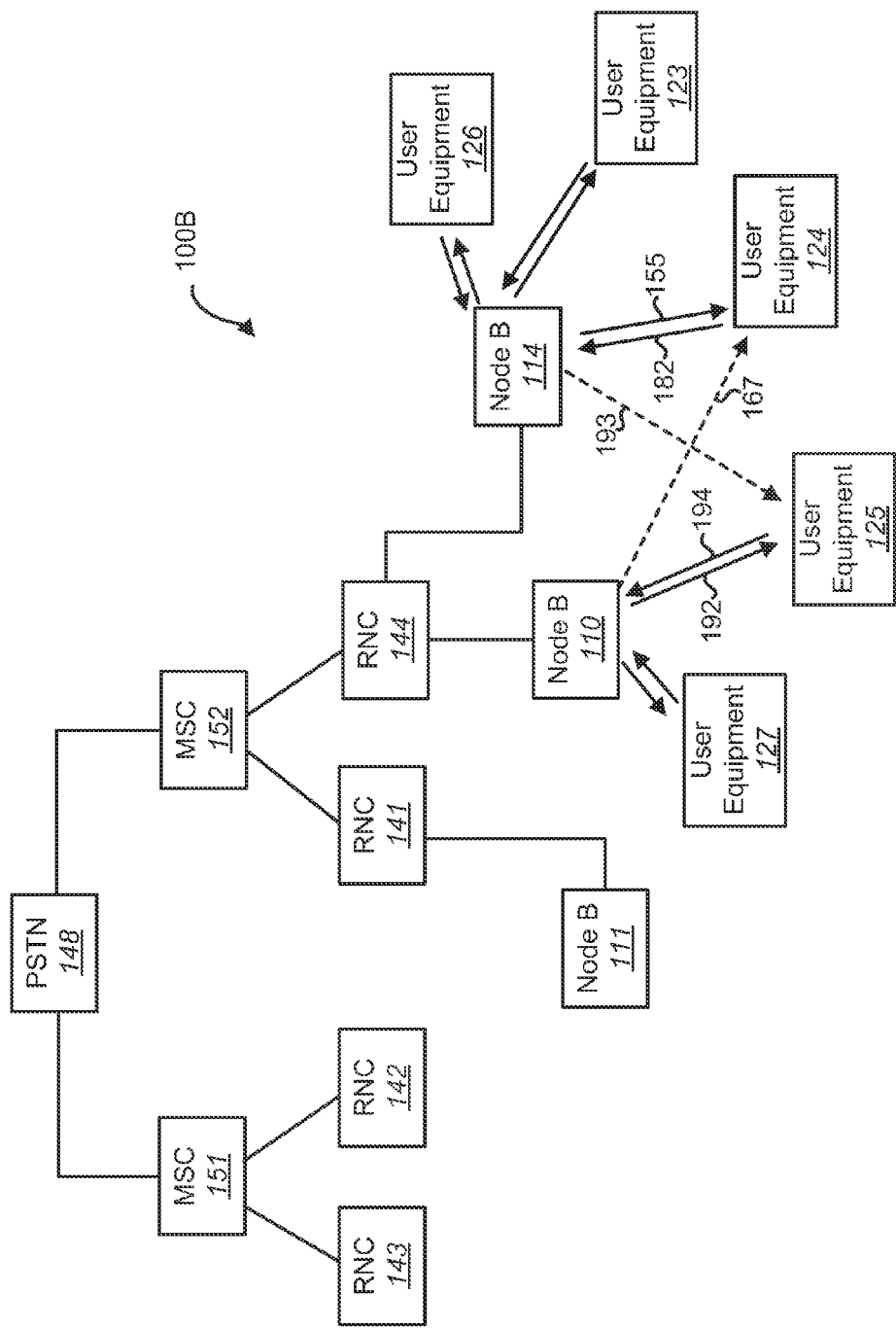
FIG. 2 is a block diagram illustrating a wireless communications system.

FIG. 2 is a block diagram illustrating a cellular communications system 100b. Specifically, FIG. 2 is a block diagram illustrating a communication network 100b, that includes a radio network controller (RNC) (or base station controller (BSC)) 141-144 coupled to Node Bs (or base stations or wireless base transceiver stations) 110, 111, 114. The Node Bs 110, 111, 114 communicate with user equipments (UEs) (or remote stations) 123-127 through corresponding wireless connections 155, 167, 182, 192, 193, 194. A communications channel includes a forward link (FL) (also known as a downlink) 155, 192 for transmissions from the Node Bs 110, 111, 114 to the user equipments (UEs) 123-127, and a reverse link (RL) (also known as an uplink) 182, 194 for transmissions from the UEs 123-127 to the Node Bs 110, 111, 114. The RNC 141-144 provides control functionalities for one or more Node Bs 110, 111, 114. The radio network controller 141-144 is coupled to a public switched telephone network (PSTN) 148 through a mobile switching center (MSC) 151, 152. In another example, the radio network controller (RNC) 141-144 is coupled to a packet switched network (PSN) (not shown) through a packet data server node (PDSN) (not shown). Data interchange between various network elements, such as the radio network controller (RNC) 141-144 and a packet data server node, can be implemented using any number of protocols, for example, the Internet Protocol ("IP"), an asynchronous transfer mode (ATM) protocol, T1, E1, frame relay and other protocols.

The RNC 141-144 fills multiple roles. First, it may control the admission of new UEs 123-127 or services attempting to use the Node Bs 110, 111, 114. Second, from a Node B's 110, 111, 114 point of view, the RNC 141-144 is a controlling RNC 141-144. Controlling admission ensures that UEs 123-127 are allocated radio resources (bandwidth and signal/noise ratio) up to what the network has available. It is where the Iub interface from the Node Bs 110, 111, 114 terminates. From the UEs 123-127, or mobile, point of view, the RNC 141-144 acts as a serving RNC 141-144, in which it terminates the UEs' 123-127 link layer communications. From a core network 121 point of view, the serving RNC 141-144 terminates the Iu for the UEs 123-127. The serving RNC 141-144 also controls the admission of new UEs 123-127 or services attempting to use the core network 121 over its Iu interface.

Wideband Code Division Multiple Access (WCDMA).

For an air interface, UMTS most commonly uses a wideband spread-spectrum mobile air interface known as wideband code division multiple access (or W-CDMA). W-CDMA uses a direct sequence code division multiple access signaling method (or CDMA) to separate users. W-CDMA is a third generation standard for mobile communications. W-CDMA evolved from GSM (Global System for Mobile Communications)/GPRS, a second generation standard, which is oriented to voice communications with limited data capability. The first commercial deployments of W-CDMA are based on a version of the standards called W-CDMA Release 99.

The Release 99 specification defines two techniques to enable uplink packet data. Most commonly, data transmission is supported using either the Dedicated Channel (DCH) or the Random Access Channel (RACH). However, the DCH is the primary channel for support of packet data services. Each remote station (or user equipment) 123-127 uses an orthogonal variable spreading factor (OVSF) code. An OVSF code is an orthogonal code that facilitates uniquely identifying individual communication channels, as will be appreciated by one skilled in the art. In addition, micro diversity is supported using soft handover and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is the requirement that a receiver aligns its PN sequences to those of the Node Bs 110, 111, 114. Some systems, such as those defined by the W-CDMA standard, differentiate base stations 110, 111, 114 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA Node Bs 110, 111, 114 operate asynchronously in relation to each other, so knowledge of the frame timing of one base station 110, 111, 114 does not translate into knowledge of the frame timing of any other Node B 110, 111, 114. In order to acquire this knowledge, W-CDMA systems uses synchronization channels and a cell searching technique.

HSPA.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Release 7 HSPA+ uses three enhancements to improve data rate. First, it introduced support for 2×2 MIMO on the downlink. With MIMO, the peak data rate supported on the downlink is 28 Mbps. Second, higher-order modulation is introduced on the downlink. The use of 64 QAM on the downlink allows peak data rates of 21 Mbps. Third, higher-order modulation is introduced on the uplink. The use of 16 QAM on the uplink allows peak data rates of 11 Mbps.

In HSUPA, the Node B 110, 111, 114 allows several user equipment (UE) devices 123-127 to transmit at a certain power level at the same time. These grants are assigned to users by using a fast scheduling algorithm that allocates the resources on a short-term basis (every tens of milliseconds). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a base transceiver station 110, 111, 114 of an access network sends downlink payload data to user equipment (UE) devices 123-127 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into Release 1999 (legacy system) codes that are typically used for cellular telephony (voice), and HSDPA codes that are used for data services. For each transmission time interval (TTI), the dedicated control information sent to an HSDPA-enabled user equipment (UE) device 123-127 indicates to the device 123-127 which codes within the code space will be used to send downlink payload data to the device, and the modulation that will be used for transmission of the downlink payload data.

With HSDPA operation, downlink transmissions to the user equipment (UE) devices 123-127 may be scheduled for different transmission time intervals (TTIs) using the 15 available HSDPA OVSF codes. For a given TTI, each user equipment (UE) device 123-127 may be using one or more of the 15 HSDPA codes, depending on the downlink bandwidth allocated to the device during the TTI. As has already been mentioned, for each TTI the control information indicates to the user equipment (UE) devices 123-127 which codes within the code space will be used to send downlink payload data (data other than control data of the radio network) to the device, and the modulation that will be used for transmission of the downlink payload data.

MIMO.

In a MIMO system, there are a number of transmitter antennas (N) and a number of receiver antennas (M) (i.e., N×M signal paths) from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. It is noted that a transmission pipe does not correspond to an antenna transmission chain or any one particular transmission path.

Communication systems may use a single carrier frequency or multiple carrier frequencies. Each link may incorporate a different number of carrier frequencies. Furthermore, an access terminal (or user equipment (UE)) 123-127 may be any data device that communicates through a wireless channel or through a wired channel, for example using fiber optic or coaxial cables. A UE 123-127 may be any of a number of types of devices including but not limited to a cellular phone, PC card, compact flash, external or internal modem, laptop computer, personal computer, handheld device, personal digital assistant (PDA) or wireless or wire line phone. The UEs 123-127 may also be referred to as an access terminal, a wireless communication device, a user terminal, a remote station, a mobile station, a mobile terminal or a subscriber station. Also, the UEs 123-127 may be mobile or stationary.

User equipments (UEs) 123-127 that have established an active traffic channel connection with one or more Node Bs 110, 111, 114 are called active user equipments (UEs) 123-127, and are said to be in a traffic state. User equipments (UEs) 123-127 that are in the process of establishing an active traffic channel connection with one or more Node Bs 110, 111, 114 are said to be in a connection setup state. User equipments (UEs) 123-127 may be any data device that communicates through a wireless channel or through a wired channel, for example using fiber optic or coaxial cables. The communication link through which the user equipments (UEs) 123-127 send signals to the Node Bs 110, 111, 114 is called an uplink. The communication link through which a Node B 110, 111, 114 sends signals to a user equipment (UE) 123-127 is called a downlink.

Figure 3:
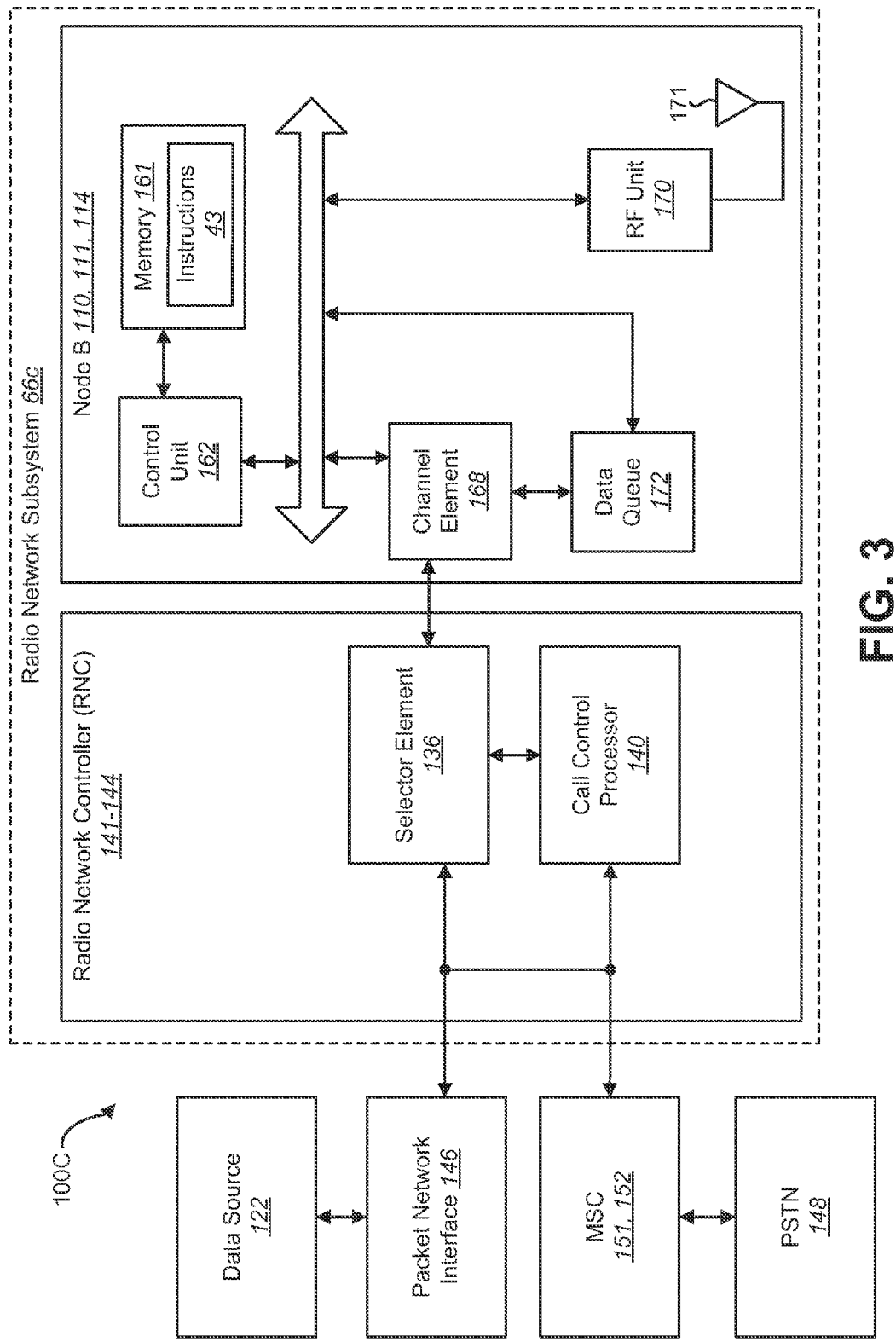
FIG. 3 is block diagram illustrating another wireless communication system.

FIG. 3 is block diagram illustrating another wireless communication system 100c. A Node B 110, 111, 114 and radio network controller (RNC) 141-144 may interface with a packet network interface 146. Note in FIG. 3, only one Node B 110, 111, 114 is shown for simplicity. The Node Bs 110, 111, 114 and radio network controller (RNC) 141-144 may be part of a radio network subsystem (RNS) 66c. The associated quantity of data to be transmitted from the Node B 110, 111, 114 is retrieved from a data queue 172 and provided to the channel element 168 for transmission to the user equipments (UEs) 123-127 associated with the data queue 172.

Radio network controller (RNC) 141-144 interfaces with a Public Switched Telephone Network (PSTN) 148 through a mobile switching center (MSC) 151, 152. Also, the radio network controller (RNC) 141-144 may interface with one or more Node Bs 110, 111, 114 (only one Node B 110, 111, 114 is shown in FIG. 2 for simplicity). In addition, the radio network controller (RNC) 141-144 may interface with a Packet Network Interface 146. Radio network controller (RNC) 141-144 may coordinate the communication between user equipments (UEs) 123-127 in the communication system and other users connected to packet network interface 146 and PSTN 148. PSTN 148 may interface with users through a standard telephone network (not shown in FIG. 3).

Radio network controller (RNC) 141-144 may include many selector elements 136, although only one is shown in FIG. 3 for simplicity. Each selector element 136 is assigned to control communication between one or more Node B's 110, 111, 114 and one user equipment (UE) 123-127 (not shown). If selector element 136 has not been assigned to a given user equipment (UE) 123-127, a call control processor 140 is informed of the need to page the user equipment (UE) 123-127. Call control processor 140 then directs the Node B 110, 111, 114 to page the user equipments (UE) 123-127.

A data source 122 includes data that is to be transmitted to a given user equipment (UE) 123-127. Data source 122 provides the data to packet network interface 146. Packet network interface 146 receives the data and routes the data to the selector element 136. Selector element 136 then transmits the data to Node B 110, 111, 114 in communication with the target user equipments (UEs) 123-127. In the exemplary embodiment, each Node B 110, 111, 114 maintains a data queue 172, which stores the data to be transmitted to the user equipments (UEs) 123-127. The Node B 110, 111, 114 may also include memory 161 that includes stored instructions 43 in the form of software or firmware. These instructions 43 may be executed by the control unit 162 of the Node B 110, 111, 114.

For each data packet, channel element 168 inserts the necessary control fields. In the exemplary embodiment, channel element 168 performs a cyclic redundancy check (CRC), encoding of the data packet and control fields and inserts a set of code tail bits. The data packet, control fields, CRC parity bits and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to radio frequency (RF) unit 170, which quadrature modulates, filters, and amplifies the signal. The downlink signal is transmitted over the air through an antenna 171 to the downlink.

At the user equipments (UEs) 123-127, the downlink signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder that performs the inverse of the signal processing functions done at Node B 110, 111, 114, specifically the de-interleaving, decoding, and CRC check functions. The decoded data is provided to a data sink.

In a cellular system, two types of problems may occur in the uplink. One is related to the transmit power limit at the user equipments (UEs) 123-127, and the other is related to uplink interference received at the Node Bs 110, 111, 114 in the cellular system. With regard to transmit power limitations, a user may be unhappy due to limited transmit power available for data transmission. With regard to uplink interference, signals from other cell users may become the limiting factor to system capacity. Any scheme that minimizes the required transmit power at the user equipments (UEs) 123-127 for a given data rate helps mitigate these two problems.

Figure 4:
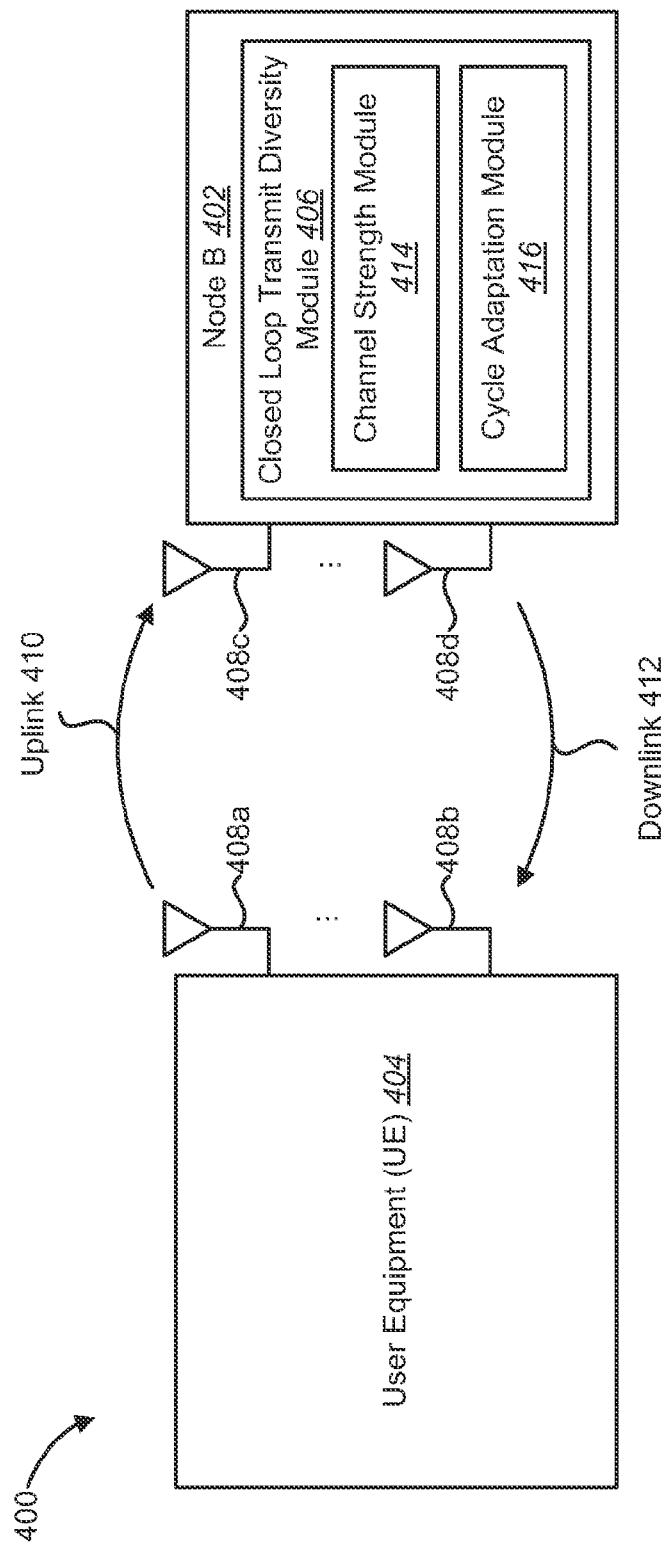
FIG. 4 is a block diagram illustrating a wireless communication system with multiple wireless devices.

FIG. 4 is a block diagram illustrating a wireless communication system 400 with multiple wireless devices. A wireless device may be a Node B 402, a mobile device, a controller or the like. A Node B 402 is a station that communicates with one or more UEs 404. A Node B 402 may also be referred to as, and may include some or all of the functionality of, an access point, a broadcast transmitter, a base station, an evolved Node B, etc. The term "Node B" will be used herein. Each Node B 402 provides communication coverage for a particular geographic area. A Node B 402 may provide communication coverage for one or more UEs 404. The term "cell" can refer to a Node B 402 and/or its coverage area depending on the context in which the term is used.

A UE 404 may also be referred to as, and may include some or all of the functionality of, a terminal, an access terminal, a wireless communication device, a subscriber unit, a station, etc. A UE 404 may be a cellular phone, a personal digital assistant (PDA), a wireless device, a wireless modem, a handheld device, a laptop computer, etc. A UE 404 may communicate with zero, one, or multiple Node Bs 402 on the downlink 412 and/or uplink 410 at any given moment. The downlink 412 (or forward link) refers to the communication link from a Node B 402 to a UE 404, and the uplink 410 (or reverse link) refers to the communication link from a UE 404 to a Node B 402.

Communication between a UE 404 in a wireless system (e.g., a multiple-access system) and a Node B 402 is achieved through transmissions over a wireless link comprised of a forward link 412 and a reverse link 410. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple transmit antennas ($M_T$) and multiple receive antennas ($M_R$) for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 400 may utilize MIMO. At the transmitter, each portion of a data stream may be transmitted from a different antenna. At the receiver, the different portions of the data stream may be received by different antennas and then combined.

Recent $3^{rd}$ Generation Partnership Project (3GPP) standards-related efforts for the Universal Mobile Telecommunications System (UMTS) Terrestrial Radio Access Network (UTRAN) have begun to consider closed-loop methods to overcome the limitations of existing open-loop methods. This may include specifying feedback information from the UTRAN to a UE 404.

The wireless communication system 400 may utilize transmit diversity. In transmit diversity, signals originating from multiple independent sources that have been modulated with identical information-bearing signals are transmitted. In transmit diversity, the transmission characteristics of the signals may vary. Significant performance gains may be achieved by using longer cycles and thus lower duty cycle when an uplink transmission configuration has longer-term advantages, thus avoiding the disadvantage of uplink transmission configuration testing. Shorter cycles may be used when rapid uplink transmission configuration selection may reflect channel dynamics. Thus, the best uplink transmission configuration or at least an acceptable uplink transmission configuration may be used.

The wireless communication system 400 may be a multiple-access system capable of supporting communication with multiple UEs 404 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems and spatial division multiple access (SDMA) systems.

In open loop uplink transmit diversity, the UE 404 may autonomously make decisions concerning transmit diversity. The UE 404 may use feedback information from the Node B 402 that may directly or indirectly indicate a measure of uplink transmit diversity performance. In contrast, in a closed loop uplink transmit diversity system, the Node B 402 may determine transmit diversity modifications for the UE 404. The Node B 402 may then send the transmit diversity modifications to the UE 404. The present systems and methods may use closed loop uplink transmit diversity. The Node B 402 may include a closed loop transmit diversity module 406. The closed loop transmit diversity module 406 may include a channel strength module 414 to determine the best antenna on the UE 404. The closed loop transmit diversity module 406 may also include a cycle adaptation module 416 that determines whether the next frame transmitted by the UE 404 should test the uplink configuration again. The closed loop transmit diversity module 406 is discussed in further detail below in relation to FIG. 8.

Uplink transmissions from the UE 404 may use one or more antennas 408a-b. Depending on feedback data from the Node B 402, some transmitted frames may use both antennas 408a-b so that the channel strengths associated with each antenna 408a-b may be measured and the Node B 402 may return more feedback data directing the UE 404 to transmit on one of the antennas 408a-b. The uplink transmissions may be received by the Node B 402 via one or more antennas 408c-d.

In one configuration, the present systems and methods may be used to perform pure antenna switching, e.g., selecting one of multiple transmit antennas 408a-b at a UE 404 for the uplink. In other words, the present systems and methods may be different than using a combination of space time block coding and single or multi-dimensional beamforming (that modifies a precoding matrix at a base station). More specifically, the present systems and methods may include a specific technique to effectively find the best UE antenna 408a-b to maximize the received signal-to-noise ratio (SNR) on the uplink, as well as a testing period and use period for the selected antenna, e.g., using feedback from the base station 402. This may include narrowing down to a small hypothesis candidate set and choosing the best hypothesis. In other words, the present systems and methods may select a best uplink transmit antenna 408a-b and determine how long to use the selected antenna.

Figure 5:
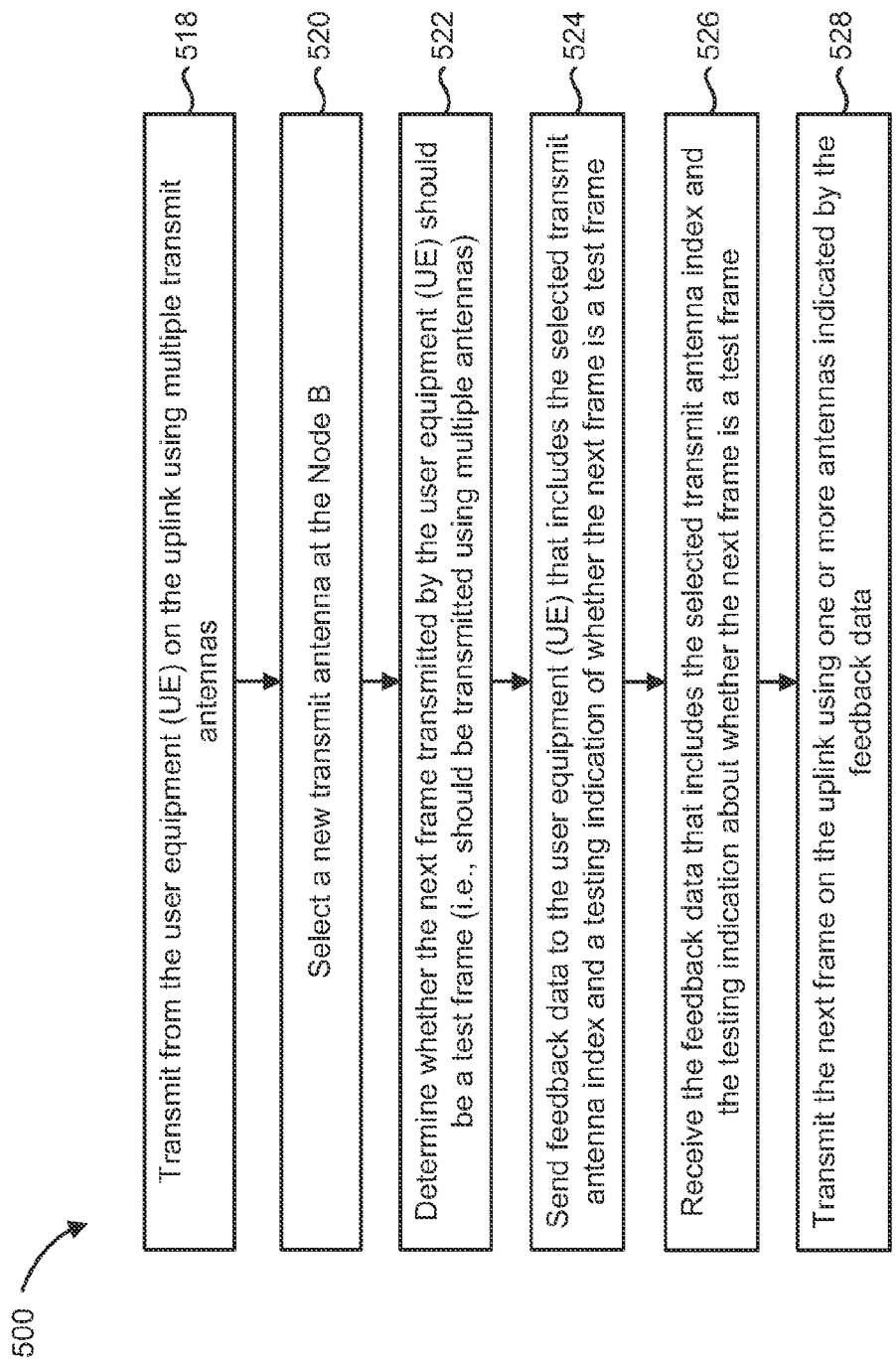
FIG. 5 is a flow diagram illustrating a method for antenna switching in a closed loop transmit diversity system.

FIG. 5 is a flow diagram illustrating a method 500 for antenna switching in a closed loop transmit diversity system 400. The method 500 may be performed by a UE 404 and a Node B 402. The closed loop antenna switching method 500 is used to take advantage of the possible imbalance of channels from each UE transmit antenna 408a-b to the Node B 402 receive antennas 408c-d. The imbalance may be due to the disparity of the quality of two transmit antennas 408a-b, the fading phenomenon, etc. If the antenna switching method 500 at the Node B 402 side detects that one of the UE transmit antennas 408a-b has better channel strength (composite of antenna quality and air link) than the other, it will signal to the UE 404 to use the stronger UE transmit antenna 408a-b for the uplink transmission. By choosing the stronger antenna 408a-b to transmit, the UE 404 may enjoy increased uplink 410 data rates or reduced transmit power, therefore improving uplink 410 coverage range.

In the method 500, the UE 404 may transmit 518 on the uplink using multiple transmit antennas. The Node B 402 may select 520 a new transmit antenna. This may be based on channel strength metrics associated with each uplink transmit antenna 408a-b. The Node B 402 may also determine 522 whether the next frame transmitted by the UE 404 should be a test frame, i.e., whether the next frame should be transmitted using multiple uplink transmit antennas 408a-b. The Node B 402 may also send 524 feedback data to the UE 404 that includes the selected transmit antenna index and a testing indication of whether the next frame is a test frame. The UE 402 may also receive 526 the feedback data that includes the selected transmit antenna index and the testing indication about whether the next frame is a test frame. The UE 402 may also transmit 528 the next frame on the uplink using one or more antennas indicated by the feedback data. The selected transmit antenna index may be encoded using direct encoding or differential encoding. For example, in direct encoding, a '0' may indicate antenna 1 and '1' may indicate antenna 2. Alternatively, in differential encoding, '0' may indicate the selected transmit antenna should switch, i.e., the new antenna is the one not being used. A '1' may indicate to the UE 402 not to switch, i.e., continue to use the same antenna.

Figure 6:
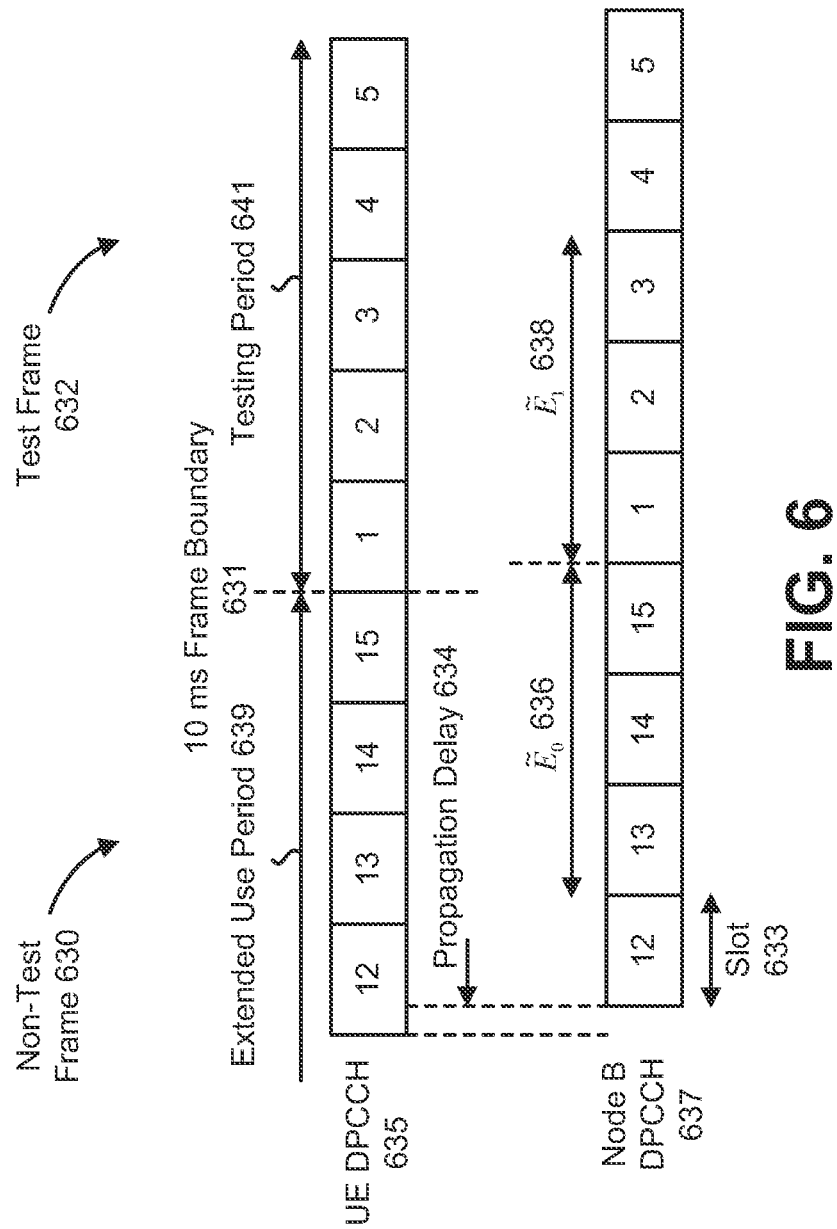
FIG. 6 is a block diagram illustrating one configuration of transmitted data in a closed loop transmit diversity system.

FIG. 6 is a block diagram illustrating one configuration of transmitted data in a closed loop transmit diversity system. Each numbered block may represent a slot 633 within a frame, e.g., a 10 millisecond frame used in HSPA. The frames are illustrated as having 15 slots 633, though other configurations may be used. The top row 635 may represent the slots 633 in a non-test frame 630 followed by a test frame 632, separated by a frame boundary 631. In other words, the top row 635 illustrates slot 633 numbers 12-15 of a non-test frame 630 followed by slots 633 1-5 of a test frame 632 as sent by a UE, e.g., on a Dedicated Physical Control Channel (DPCCH). In other configurations, where a cycle period is one frame, the non-test frame 630 may instead be a test frame 632. In a UE 404 with multiple antennas, the first five slots 633 of a test frame 632 may be transmitted using a non-selected antenna. Some or all of the data transmitted by the non-selected antenna may be used by the Node B 402 to determine a non-selected antenna channel strength metric ($\tilde{E}_1$) 638. Then, the remaining 10 slots 633 in a test frame 632 may be transmitted using the selected antenna, i.e., an antenna with a higher channel strength metric.

The bottom row 637 illustrates the received frames at the Node B 402, e.g., on the DPCCH. After a propagation delay 634, the Node B 402 may receive the frames from the UE 404. A portion of the slots 633 from the non-test frame 630 may be used to determine a selected antenna channel strength metric ($\tilde{E}_0$) 636. Based on a comparison of the selected antenna channel strength metric ($\tilde{E}_0$) 636 and the non-selected antenna channel strength metric ($\tilde{E}_1$) 638, the Node B 402 may determine a new selected antenna for the UE 404 to use. Each cycle period (that includes one or more frames) may include a testing period 641 and an extended use period 639 that are mutually exclusive, i.e., a cycle period may include at least one test frame 632 and possibly one or more non-test frames 630 (however, if the cycle period is one frame, there will not be any non-test frames 632). The testing period 641 may be the portion of the cycle period that is transmitted using a non-selected antenna, e.g., the testing period may be the first five slots 633 in the first frame (test frame 632) of a cycle period. The extended use period 639 may be the remainder of the cycle period that is transmitted using the selected antenna. The extended use period 639 may span more than one frame and may include portions of a frame, e.g., the extended use period 639 may include the last ten slots 633 of a test frame 632 and three non-test frames 630. A new cycle period may be determined at the end of the current testing period 641.

Figure 7:
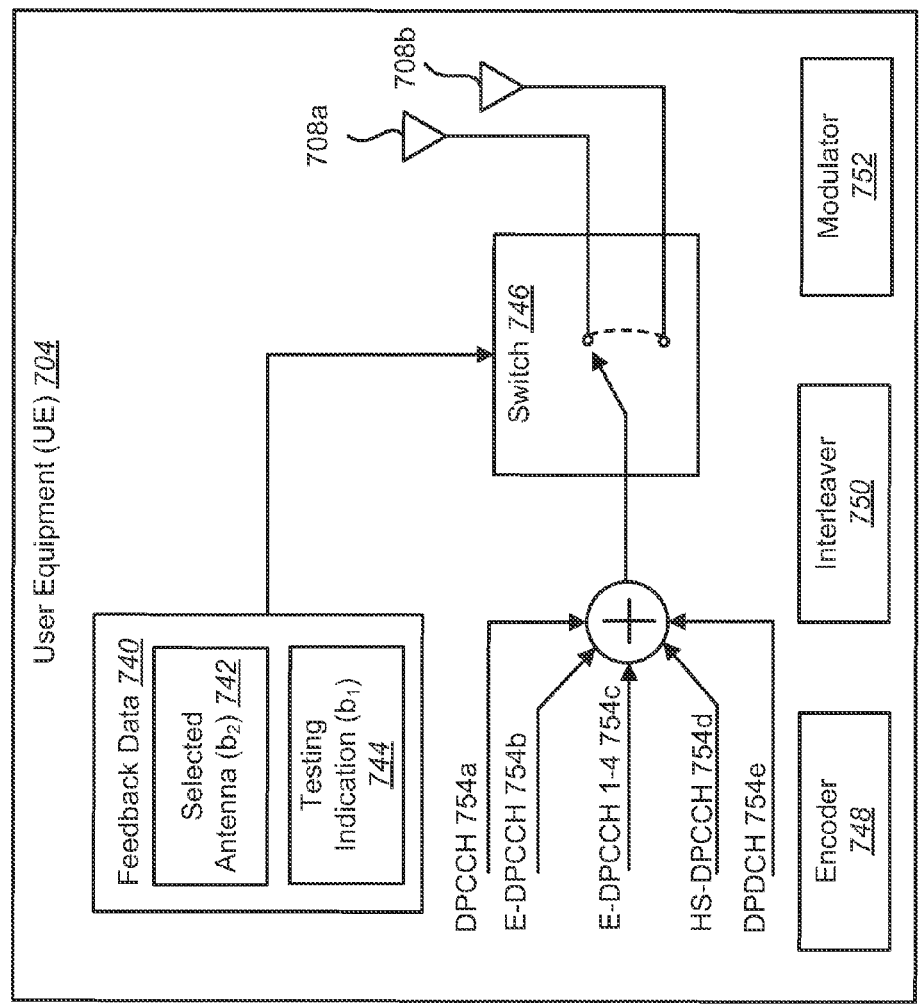
FIG. 7 is a block diagram illustrating a user equipment (UE) in a transmit diversity system.

FIG. 7 is a block diagram illustrating a UE 704 in a closed loop transmit diversity system. The UE 704 may receive feedback data 740 that includes a selected antenna ($b_2$) 742 and a testing indication ($b_1$) 744. The selected antenna ($b_2$) 742 may indicate the uplink transmit antenna 708a-b with a higher channel strength metric, as determined by a Node B 402. The feedback data 740 may be used by a switch 746 to switch between uplink transmit antennas 708a-b. In other words, the switch 746 may ensure that all data in non-test frames 630 be sent on the selected antenna ($b_2$) 742. The testing indication ($b_1$) 744 may indicate to the UE 704 whether the next frame is a test frame 632. The switch 746 may also perform the switching during test frames 632 to allow the channel strength metrics to be calculated, e.g., the first five slots 633 using the non-selected antenna and the last 10 slots 633 using the selected antenna ($b_2$) 742. Additionally, the UE 704 may also include an encoder 748, interleaver 750 and modulator 752 to process a data stream into transmission-ready form.

Whether transmitting a test frame 632 or a non-test frame 630, the UE 704 transmitter transmits the same uplink signals such as data, control and pilot channel, e.g., a conventional High Speed Packet Access (HSPA) UE. In other words, the classification of a transmitted frame as test or non-test does not affect the content of data transmitted. For any given frame, the UE 704 may transmit data over the Dedicated Physical Control Channel (DPCCH) 754a, the Enhanced Dedicated Physical Control Channel (E-DPCCH) 754b, the Enhanced Dedicated Physical Data Channels 1-4 (E-DPDCH 1-4) 754c, the High Speed Dedicated Physical Control Channel (HS-DPCCH) 754d, the Dedicated Physical Data Channel (DPDCH) 754e, or some combination. The only difference is the choice of transmit antennas 708a-b. Based on the feedback data 740 from the Node B 402, the UE 704 may use the corresponding transmit antenna. Even during the time the UE 704 is testing another transmit antenna, data and control channels are on as usual.

Figure 8:
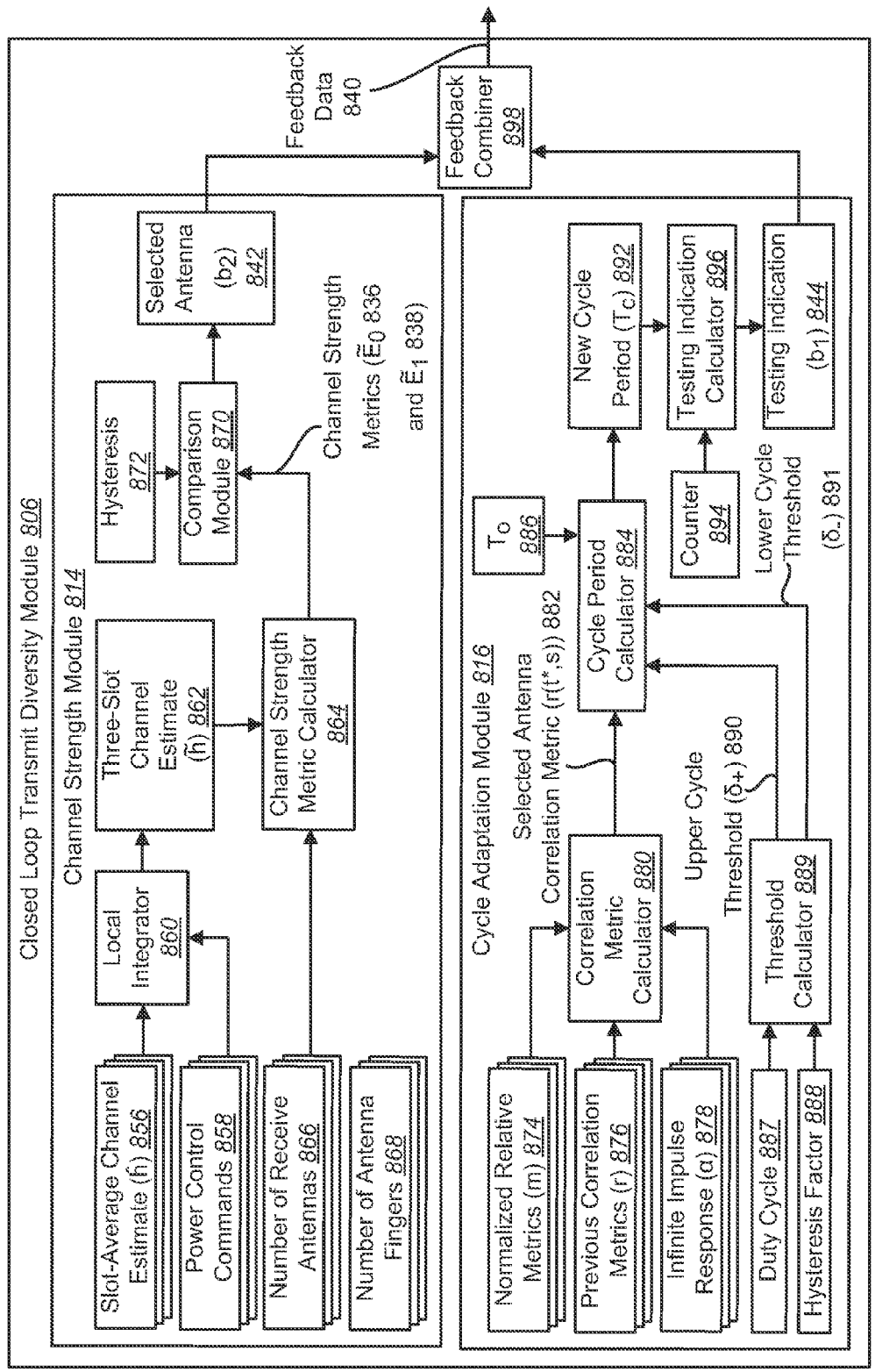
FIG. 8 is a block diagram illustrating a closed loop transmit diversity module in a Node B.

FIG. 8 is a block diagram illustrating a closed loop transmit diversity module 806 in a Node B 402. The serving Node B 402 receiver may run an adaptive algorithm to determine the best UE transmit antenna 408a-b based on the uplink channel measurement of the channels from each UE transmit antenna 408a-b to the Node B receive antennas 408c-d. There are two portions of this algorithm. First, channel strength metrics are determined and used to determine the new UE transmit antenna 408a-b. Second, the cycle period (e.g., number of frames) of the selected UE transmit antenna 408a-b is determined. Each cycle period may consist of a testing period (total five slots, with only three slots used for switching decision) and an extended use period. The first five slots of the cycle period (e.g., the first five slots of a test frame) may be transmitted on a non-selected antenna. The remainder of slots in the cycle may be transmitted on the selected antenna. Once the cycle period ends, the UE 404 may send another test frame to help the Node B 402 determine the new selected transmit antenna 408*a-b* and the new cycle period.

The channel strength metrics $\tilde{E}_0$ 836 and $\tilde{E}_1$ 838 may be determined in a channel strength module 814. The uplink channel may be denoted by $h_{r,t,k}$, where r,t,k, are the indices for receive antenna, transmit antenna and multipath respectively. It is the composite of antenna quality and air link quality. Let $\hat{h}_{r,t,k}$ be the slot-average channel estimate 856 obtained by the Node B 402 for slot n, determined by Equation (1):

$$\hat{h}_{r,t,k}[n] = \rho[n] h_{r,t,k}[n] + z[n] \tag{1}$$

where $\rho[n]$ and $z[n]$ are the power control coefficient at the UE 404 transmitter and the estimation noise, respectively. A power control command 858 may be sent to a UE 404 every slot 633. To isolate the channel strength, it may be beneficial to remove the effect of power control from the channel estimates.

Therefore, the serving Node B 402 receiver may perform local integration (e.g., using a local integrator 860) of the power control commands 858 sent to the UE 404 and remove them. In one configuration, this power control command integral is given by Equation (2):

$$\rho[n] = 10^{0.05 \sum_{k=1}^{n} \Delta[k]} \tag{2}$$

for n=1, . . . , 5. In other words, Equation (2) describes a running sum of the power control command for slot 12 of a frame previous to a test frame to slot 1 of a test frame. This sum is further scaled by 0.05 and raised to the power of 10. Furthermore, it may be desirable to obtain a three-slot channel estimate ($\tilde{h}_{r,t,k}[n_0]$) 862 by averaging over three slots as shown in Equation (3):

$$\tilde{h}_{r,t,k}[n_0] = \frac{1}{3} \sum_{n=n_0}^{n_0+2} \frac{\hat{h}_{r,t,k}[n]}{\rho[n]} \tag{3}$$

The slot index $n_0$ may be equal to 13 for the channel strength metric computation of $\tilde{E}_0$ 836 and 1 for $\tilde{E}_1$ 838, as illustrated in FIG. 6. Alternatively, the channel estimate may be averaged over a different number of slots, i.e., a two-slot channel estimate, four-slot channel estimate, etc.

For the last three slots of the current cycle, the selected channel strength metric ($\tilde{E}_0$) 836 may be computed by a channel strength metric calculator 864 according to Equation (4):

$$\sum_{r=1}^{N_R} \sum_{k=1}^{L_r} |\tilde{h}_{r,t,k}[n_0]|^2 \tag{4}$$

where $N_R, L_r$ are the number of receive antennas 866 (four for softer handover, two otherwise), and the number of fingers 868 for the receive antenna r respectively. Similarly, the non-selected channel strength metric ($\tilde{E}_1$) 838 may be determined for the first three slots in a test frame by the channel strength metric calculator 864. Then the UE transmit antenna 408*a-b* may updated according to the rule in Equation (5):

$$b_2 = \begin{cases} S, & \text{if } \tilde{E}_0 < \tilde{E}_1 - \Delta E \\ NS, & \text{otherwise} \end{cases} \tag{5}$$

where "S" represents switching of new UE transmit antenna, "NS" represents no switching, and $\Delta_E$ is the hysteresis 872. The hysteresis 872 may be used to make sure that switching happens only if enough difference between two channel strength metrics is observed. Equation (5) may be implemented with a comparison module 870 that receives $\tilde{E}_0$ 836, $\tilde{E}_1$ 838, and the hysteresis ($\Delta_E$) 872 as input and produces a selected antenna ($b_2$) 842 bit. Equation (5) is an example of differential encoding of a selected antenna index.

For the frames where no testing happens at the UE 404 (i.e., frames other than the first one of a cycle), the Node B 402 may send "NS" to the UE 404, e.g., selected antenna ($b_2$) 842 may be set to a particular value. A more generalized decision mechanism may be to accumulate the channel strength over multiple frames, during which the "Test" and "NS" commands are sent to the UE 404.

Once a selected transmit antenna ($b_2$) 842 is chosen as the current transmit antenna, a cycle adaptation module 816 may determine how many frames will be used, i.e., whether the next frame is a test frame.

At the serving Node B 402 receiver, the correlation metrics are maintained for both transmit antennas 408*a-b*. First, once the s-th testing (of the s-th cycle) is done, the normalized relative metric (m) 874 is defined according to Equation (6):

$$m(t, s) = \begin{cases} 1, & \text{antenna } t \text{ is the winner} \\ 0, & \text{otherwise} \end{cases} \tag{6}$$

where t is the UE transmit antenna 408*a-b* index.

Next, a selected antenna correlation metric 882 may be determined by a correlation metric calculator 880 using previous correlation metrics 876. The correlation metric is defined according to Equation (7):

$$r(t,s) = \alpha m(t,s) m(t,s,-1) + (1-\alpha) r(t,s-1) \tag{7}$$

where $0 \leq \alpha \leq 1$ is the Infinite Impulse Response filtering coefficient 878. Given the correlation metric, we can determine the new cycle period $T_C$ (unit: frame) by Equation (8):

$$T_c = \begin{cases} T_0, & r(t^*, s) < r_{min} \\ 0.5 T_c, & r_{min} \leq r(t^*, s) \leq \delta_- \\ T_c, & \delta_- \leq r(t^*, s) \leq \delta_+ \\ 2 T_c, & \delta_+ \leq r(t^*, s) \end{cases} \tag{8}$$

where t* indicates the selected UE transmit antenna ($b_2$) 842. The initial value of $T_C$ 892 is $T_0$ 886, which has default value of one frame. The upper cycle threshold ($\delta_+$) 890 and lower cycle threshold ($\delta_-$) 891 in Equation (8) depend on the duty cycle $d = 1/(3T_C)$ 887 and may be determined by a threshold calculator 889 according to Equations (9) and (10):

$$\delta_+ = (1 - c_{hyst}) f(0, d) + c_{hyst} f(1, d) \tag{9}$$

$$\delta_- = (1 - c_{hyst}) f(0, d) + c_{hyst} f(-1, d) \tag{10}$$

where $c_{hyst}$ is the hysteresis factor 888 and f(a, d) is given according to Equation (11):

$$f(a, d) = 1 - 2^{1-a} d \tag{11}$$

where f(a, d) is an intermediate function used to determine the upper cycle threshold ($\delta_+$) 890 and lower cycle threshold ($\delta_-$) 891, and a and d are variables used to determine f(a, d). A new cycle period ($T_C$) 892 may be computed once per cycle period. Once the new cycle period ($T_C$) 892 is computed (e.g., by a cycle period calculator 884), the Node B 402 may determine a testing indication ($b_1$) 844 using a testing indication calculator 896 according to Equation (12):

$$b_1 = \begin{cases} T & \text{last frame of the current cycle} \\ NT & \text{otherwise} \end{cases} \quad (12)$$

where "T" represents testing and "NT" represents no testing. This may include comparing an accumulated counter 894 to the new cycle period ($T_C$) 892. The counter 894 may reset once a new test frame begins. At the end of the testing period 641, the Node B 402 may determine, at slot 5, the new cycle period ($T_C$) 892, which is the number of use frames for the currently selected antenna ($b_2$) 842 plus one frame due to test frame 632. Bit $b_1$=T may be sent at slot 5 of last frame of this new cycle period ($T_C$) 892 (in case of a one-frame cycle period, $b_1$=T may be sent on the $5^{th}$ slot of the test frame 632). For the remaining frames, the Node B 402 may send $b_1$=NT.

A feedback combiner 898 may combine the testing indication ($b_1$) 844 with the selected antenna ($b_2$) 842 to produce feedback data 840 that may be sent to the UE 404. The Node B 402 transmitter may send the selected antenna ($b_2$) 842 and testing indication ($b_1$) 844 to the UE 404 via the Fractional Dedicated Physical Channel (F-DPCH), e.g., by puncturing the power control bits. As used herein, the selected antenna ($b_2$) 842 may refer to the selected antenna index, i.e., the index may be the data actually transmitted (direct encoding) or inferred from the data actually transmitted (differential encoding) to indicate the selected antenna ($b_2$) 842.

Figure 9:
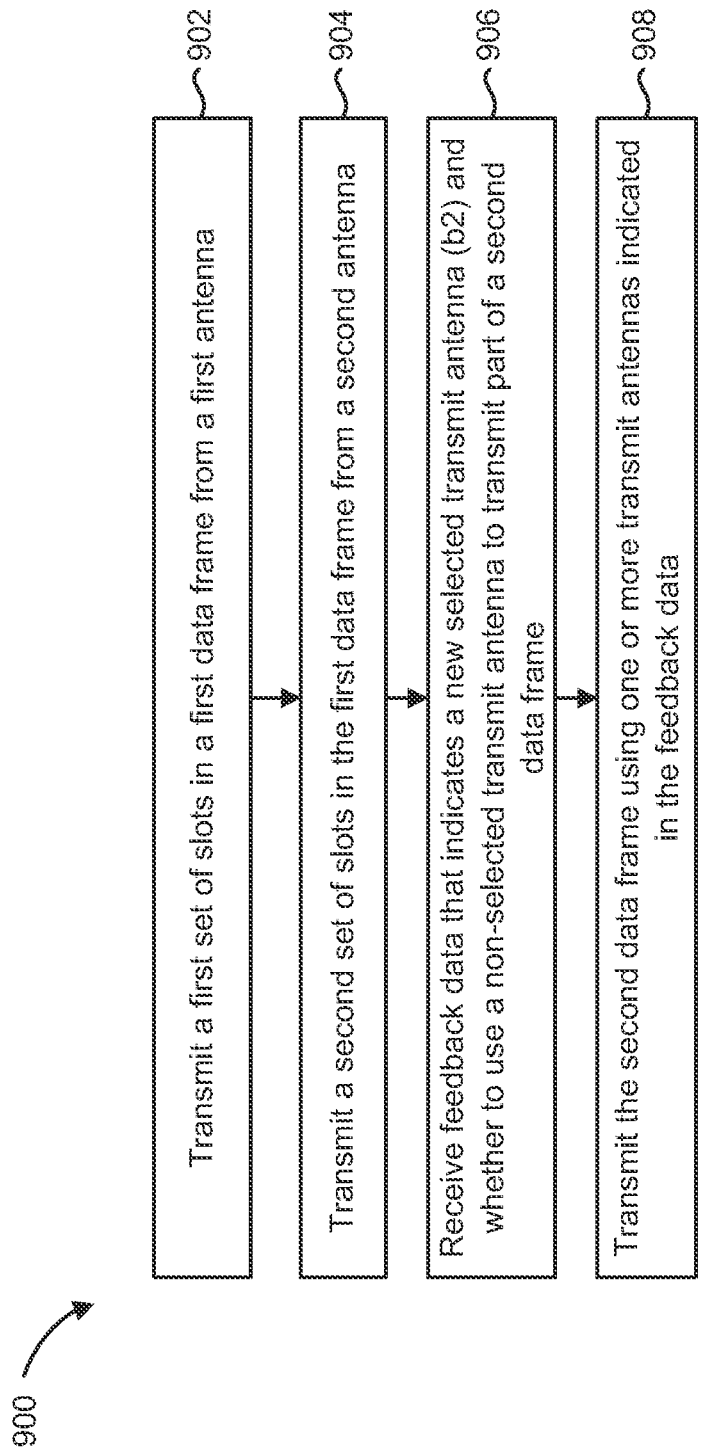
FIG. 9 is a flow diagram illustrating a method for antenna selection in a closed loop transmit diversity system.

FIG. 9 is a flow diagram illustrating a method 900 for antenna selection in a closed loop transmit diversity system. The method 900 may be performed by a UE 404. The UE 404 may transmit 902 a first set of slots in a first data frame from a first antenna. The UE 404 may also transmit 904 a second set of slots in the first data frame from a second antenna. In other words, the UE 404 may transmit a test frame 632 where the first slots in the frame are transmitted using a non-selected antenna and the remaining slots in the test frame 632 are transmitted using a selected antenna. The UE 404 may also receive 906 feedback data 840 that indicates a new selected transmit antenna ($b_2$) 842 and whether to use a non-selected transmit antenna to transmit part of a second data frame. In other words, the feedback data 840 may include the selected antenna ($b_2$) 842 and the testing indication ($b_1$) 844 that indicates whether the next frame is a test frame 632. The UE 404 may also transmit 908 the second data frame using one or more transmit antennas indicated in the feedback data 840. In other words, if the testing indication ($b_1$) 844 indicates that the next frame is a test frame 632, the UE 404 may use a non-selected antenna and a selected antenna as described above. However, if the testing indication ($b_1$) 844 indicates that the next frame is a non-test frame 630, the UE 404 may use only the selected antenna ($b_2$) 842.

Figure 10:
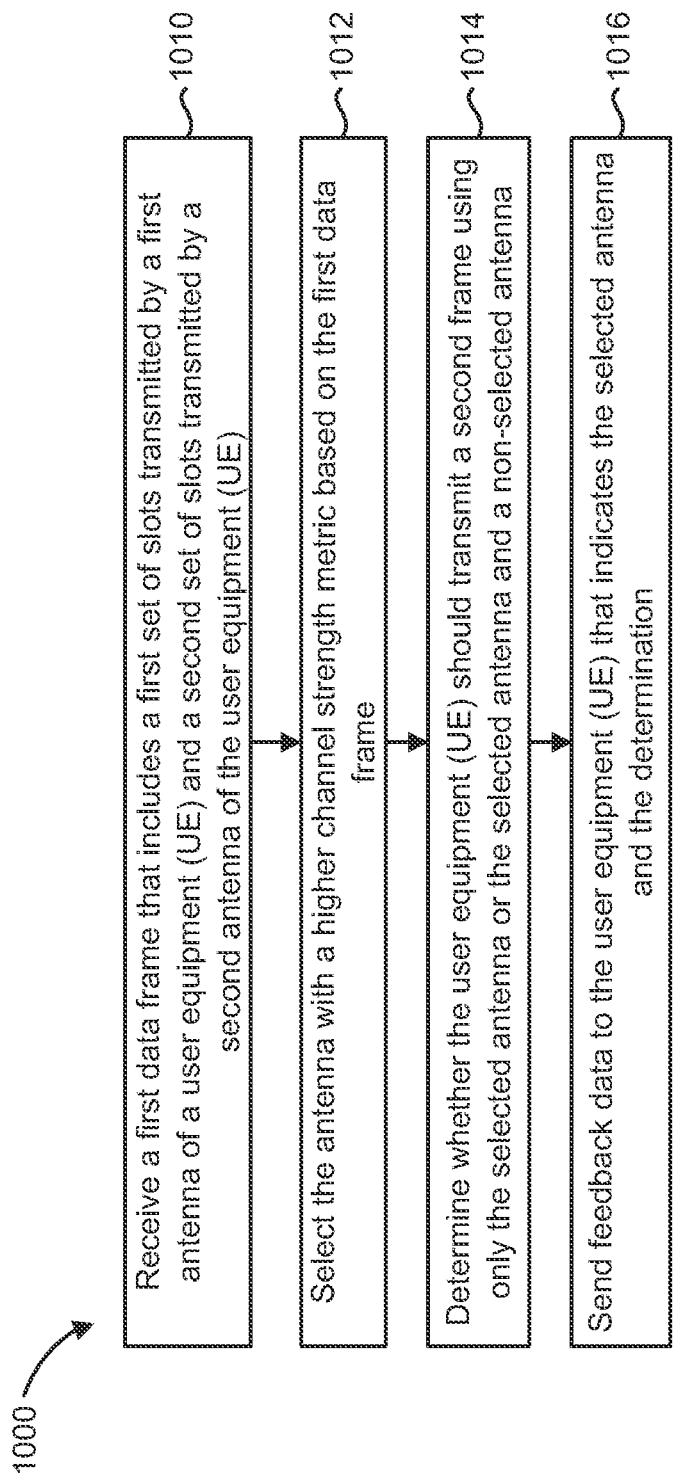
FIG. 10 is a flow diagram illustrating a method for antenna selection in a closed loop transmit diversity system.

FIG. 10 is a flow diagram illustrating a method 1000 for antenna selection in a closed loop transmit diversity system. The method 1000 may be performed by a Node B 402. The Node B 402 may receive 1010 a first data frame that includes a first set of slots transmitted by a first antenna of a UE 404 and a second set of slots transmitted by a second antenna of the UE 404, i.e., the Node B 402 may receive 1010 a test frame 632. The Node B 402 may also select 1012 the antenna with a higher channel strength metric based on the first data frame. This may include determining the non-selected channel strength metric ($\tilde{E}_1$) 838 and the selected channel strength metric ($\tilde{E}_0$) 836 and comparing them to determine the new selected antenna ($b_2$) 842. The Node B 402 may also determine 1014 whether the UE 404 should transmit a second frame using only the selected antenna ($b_2$) 842 (i.e., when transmitting a non-test frame 630) or the selected antenna ($b_2$) 842 and a non-selected antenna (i.e., when transmitting a test frame 632). This information may be conveyed in a testing indication 844. The Node B 402 may also send 1016 feedback data to the UE 402 that indicates the selected antenna and the determination, i.e., the Node B 404 may send 1016 the selected antenna 842 and the testing indication ($b_1$) 844 to the UE 404.

Figure 11:
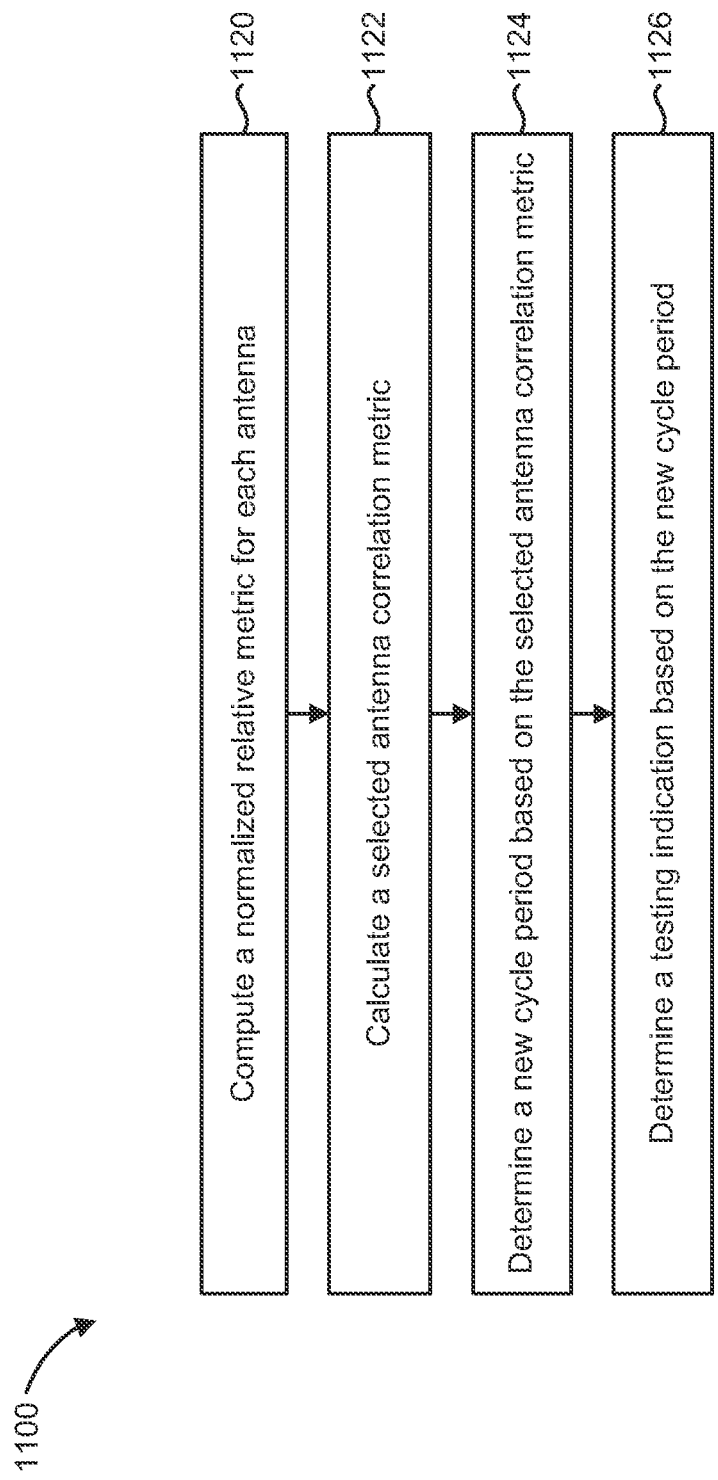
FIG. 11 is a flow diagram illustrating a method for adaptively changing a cycle period in a closed loop transmit diversity system.

FIG. 11 is a flow diagram illustrating a method 1100 for adaptively changing a cycle period in a closed loop transmit diversity system. In other words, the method in FIG. 11 is a further explanation of one configuration of step 1014 in the method 1000 illustrated in FIG. 10. The method 1100 may be performed by a Node B 402 and may be performed in response to receiving a test frame 632. The Node B 402 may compute 1120 a normalized relative metric (m) 874 for each antenna, e.g., defined according to Equation (6). The Node B 402 may also calculate 1122 a selected antenna correlation metric 882, e.g., defined according to Equation (7). The Node B 402 may also determine 1124 a new cycle period ($T_a$) 892 based on the selected antenna correlation metric 882. This may include using the rule in Equation (8). The Node B 402 may also determine 1126 a testing indication ($b_1$) 844 based on the new cycle period ($T_C$) 892.

Figure 12:
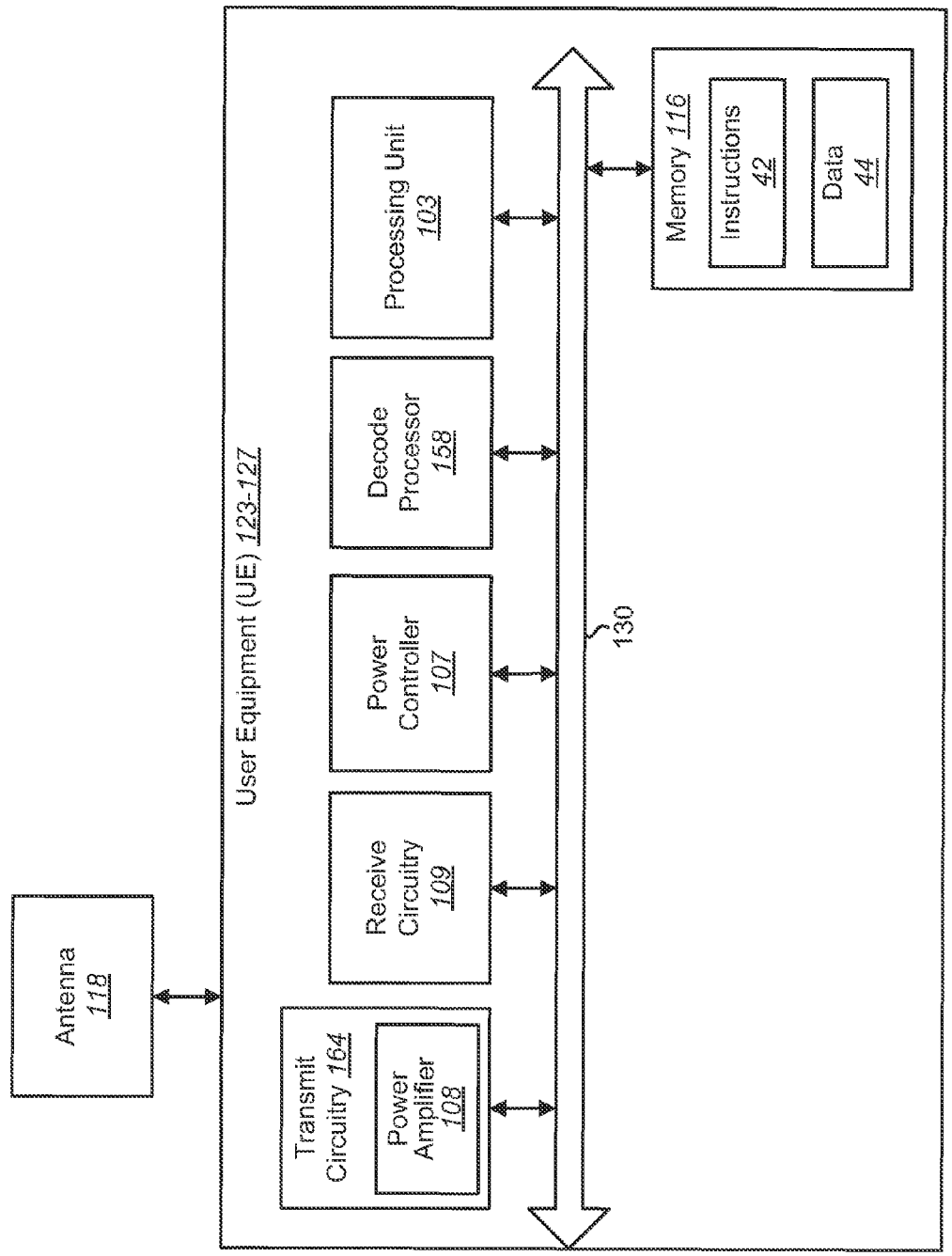
FIG. 12 is a block diagram illustrating a user equipment (UE)

FIG. 12 is a block diagram illustrating a user equipment (UE) 123-127. Note in FIG. 12, only one user equipment (UE) 123-127 is shown for simplicity. The UE 123-127 may include transmit circuitry 164 (including a power amplifier 108), receive circuitry 109, power controller 107, decode processor 158, a processing unit 103 for use in processing signals, and memory 116. The transmit circuitry 164 and a receive circuitry 109 may allow transmission and reception of data 44, such as audio communications, between the UE 123-127 and a remote location. The transmit circuitry 164 and receive circuitry 109 may be coupled to an antenna 118.

The processing unit 103 controls operation of the UE 123-127. The processing unit 103 may also be referred to as a central processing unit (CPU). Memory 116, which may include both read-only memory (ROM) and random access memory (RAM), provides instructions 42 and data 44 to the processing unit 103. A portion of the memory 116 may also include non-volatile random access memory (NVRAM).

The various components of the UE 123-127 are coupled together by a bus system 130, which may include a power bus, a control signal bus and a status signal bus, in addition to a data bus. However, for the sake of clarity, the various busses are illustrated in FIG. 12 as the bus system 130.

The steps of the methods discussed may also be stored as instructions 43 in the form of software or firmware located in memory 161 in the Node B 110, 111, 114, as shown in FIG. 3. These instructions 43 may be executed by the control unit 162 of the Node B 110, 111, 114. Alternatively, or in conjunction, the steps of the methods discussed may be stored as instructions 42 in the form of software or firmware located in memory 116 in the UE 123-127 illustrated in FIG. 12. These instructions 42 may be executed by the processing unit 103 of the UE 123-127 in FIG. 12.

Figure 13:
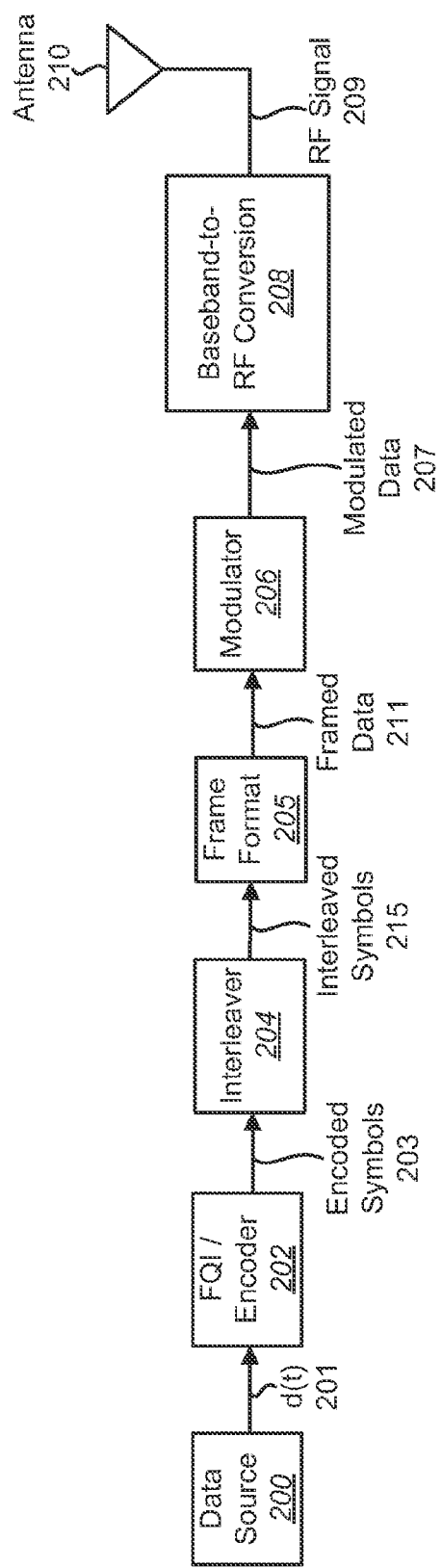
FIG. 13 illustrates an example of a transmitter structure and/or process that may be implemented, e.g., at a user equipment (UE).

FIG. 13 illustrates an example of a transmitter structure and/or process, which may be implemented, e.g., at user equipment (UE) 123-127. The functions and components shown in FIG. 13 may be implemented by software, hardware, or a combination of software and hardware. Other functions may be added to FIG. 13 in addition to or instead of the functions shown in FIG. 13.

In FIG. 13, a data source 200 provides data d(t) 201 to a frame quality indicator (FQI)/encoder 202. The FQI/encoder 202 may append a frame quality indicator (FQI) such as cyclic redundancy check (CRC) to the data d(t) 201. The FQI/encoder 202 may further encode the data d(t) 201 and FQI using one or more coding schemes to provide encoded symbols 203 to an interleaver 204. Each coding scheme may include one or more types of coding, e.g., convolutional coding, Turbo coding, block coding, repetition coding, other types of coding or no coding at all. Other coding schemes may include automatic repeat request (ARQ), hybrid ARQ (H-ARQ) and incremental redundancy repeat techniques. Different types of data may be encoded with different coding schemes.

An interleaver 204 interleaves the encoded data symbols 203 in time to combat fading, and generates interleaved symbols 215. The interleaved symbols of signal 215 may be mapped by a frame format block 205 to a pre-defined frame format to produce a frame (or framed data) 211. In an implementation, a frame format 205 may specify the frame 211 as being composed of a plurality of sub-segments. In an implementation, sub-segments may be any successive portions of a frame 211 along a given dimension, e.g., time, frequency, code, or any other dimension. A frame 211 may be composed of a fixed plurality of such sub-segments, each sub-segment containing a portion of the total number of symbols allocated to the frame. For example, in an exemplary embodiment according to the W-CDMA standard, a sub-segment may be defined as a slot. In an implementation according to the cdma2000 standard, a sub-segment may be defined as a power control group (PCG). In one example, the interleaved symbols 215 are segmented into a plurality S of sub-segments making up a frame 211.

In certain implementations, a frame format 205 may further specify the inclusion of, for example, control symbols (not shown) along with the interleaved symbols 215. Such control symbols may include, for example, power control symbols, frame format information symbols, etc.

A modulator 206 modulates the frame 211 to generate modulated data 207. Examples of modulation techniques include binary phase shift keying (BPSK) and quadrature phase shift keying (QPSK). The modulator 206 may also repeat a sequence of modulated data 207.

A baseband-to-radio-frequency (RF) conversion block 208 may convert the modulated data 207 to RF signals 209 for transmission via an antenna 210 as signal over a wireless communication link to one or more Node B station receivers.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in Random Access Memory (RAM), flash memory, Read-Only Memory (ROM), Electrically Programmable ROM (EPROM), Electrically Erasable Programmable ROM (EEPROM), registers, hard disk, a removable disk, a CD-ROM or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware or any combination thereof. If implemented in software, the functions may be stored on or transmitted over as one or more instructions or code on a computer-readable medium. Computer-readable media includes both computer storage media and communication media, including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Also, any connection is properly termed a computer-readable medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

Therefore, the present invention is not to be limited except in accordance with the following claims.

What is claimed is:

1. A method for closed loop transmit diversity, the method comprising:
   receiving data from a user equipment (UE) that was transmitted during a cycle period using multiple transmit antennas;
   selecting a new transmit antenna for the UE based on the data;
   determining a new cycle period for the UE, wherein the new cycle period is a function of a correlation over time of decisions to select the new transmit antenna; and
   sending a new transmit antenna index, based on the new transmit antenna, and a testing indication, based on the new cycle period, to the UE, wherein the testing indication indicates whether in a next frame the UE should transmit a non-test frame using only the new transmit antenna or a test frame using both the new transmit antenna and a non-selected antenna.

2. The method of claim 1, wherein the selecting comprises comparing channel strength metrics of multiple transmit antennas to determine a stronger transmit antenna.

3. The method of claim 2, wherein the selecting further comprises determining the channel strength metrics by removing an effect of power control commands sent to the UE.

4. The method of claim 2, wherein the selecting further comprises averaging the channel strength metrics over multiple slots within a frame or over multiple frames.

5. The method of claim 1, further comprising maintaining the new cycle period at a Node B, wherein the new cycle period comprises a testing period during which the UE transmits using the non-selected antenna and an extended use period during which the UE transmits using the new transmit antenna.

6. The method of claim 1, wherein the sending comprises using a Fractional Dedicated Physical Channel (F-DPCH).

7. The method of claim 1, wherein the new transmit antenna and the new cycle period are determined at an end of a current testing period.

8. The method of claim 1, further comprising encoding the new transmit antenna index using direct encoding or differential encoding.

9. A Node B for antenna switching in a closed loop transmit diversity system, comprising:
   a processor;
   memory in electronic communication with the processor; and
   instructions stored in the memory, the instructions being executable by the processor to:
   receive data from a user equipment (UE) that was transmitted during a cycle period using multiple transmit antennas;
   select a new transmit antenna for the UE based on the data;
   determine a new cycle period for the UE, wherein the new cycle period is a function of a correlation over time of decisions to select the new transmit antenna; and
   send a new transmit antenna index, based on the new transmit antenna, and a testing indication, based on the new cycle period, to the UE, wherein the testing indication indicates whether in a next frame the UE should transmit a non-test frame using only the new transmit antenna or a test frame using both the new transmit antenna and a non-selected antenna.

10. The Node B of claim 9, wherein the instructions executable to select comprise instructions executable to compare channel strength metrics of multiple transmit antennas to determine a stronger transmit antenna.

11. The Node B of claim 10, wherein the instructions executable to select further comprise instructions executable to determine the channel strength metrics by removing an effect of power control commands sent to the UE.

12. The Node B of claim 10, wherein the instructions executable to select further comprise instructions executable to average the channel strength metrics over multiple slots within a frame or over multiple frames.

13. The Node B of claim 9, further comprising instructions executable to maintain the new cycle period at a Node B, wherein the new cycle period comprises a testing period during which the UE transmits using the non-selected antenna and an extended use period during which the UE transmits using the new transmit antenna.

14. The Node B of claim 9, wherein the instructions executable to send comprise instructions executable to use a Fractional Dedicated Physical Channel (F-DPCH).

15. The Node B of claim 9, wherein the new transmit antenna and the new cycle period are determined at an end of a current testing period.

16. The Node B of claim 9, further comprising instructions executable to encode the new transmit antenna index using direct encoding or differential encoding.

17. A Node B for antenna switching in a closed loop transmit diversity system, comprising:
   means for receiving data from a user equipment (UE) that was transmitted during a cycle period using multiple transmit antennas;
   means for selecting a new transmit antenna for the UE based on the data;
   means for determining a new cycle period for the UE, wherein the new cycle period is a function of a correlation over time of decisions to select the new transmit antenna; and
   means for sending a new transmit antenna index, based on the new transmit antenna, and a testing indication, based on the new cycle period, to the UE, wherein the testing indication indicates whether in a next frame the UE should transmit a non-test frame using only the new transmit antenna or a test frame using both the new transmit antenna and a non-selected antenna.

18. The Node B of claim 17, wherein the means for selecting comprise means for comparing channel strength metrics of multiple transmit antennas to determine a stronger transmit antenna.

19. The Node B of claim 18, wherein the means for selecting further comprise means for determining the channel strength metrics by removing an effect of power control commands sent to the UE.

20. The Node B of claim 18, wherein the means for selecting further comprise means for averaging the channel strength metrics over multiple slots within a frame or over multiple frames.

21. A computer-program product for antenna switching in a closed loop transmit diversity system, the computer-program product comprising a non-transitory computer-readable medium having instructions thereon, the instructions comprising:
  code for causing a Node B to receive data from a user equipment (UE) that was transmitted during a cycle period using multiple transmit antennas;
  code for causing the Node B to select a new transmit antenna for the (UE) based on the data;
  code for causing the Node B to determine a new cycle period for the UE, wherein the new cycle period is a function of a correlation over time of decisions to select the new transmit antenna; and
  code for causing the Node B to send a new transmit antenna index, based on the new transmit antenna, and a testing indication, based on the new cycle period, to the UE, wherein the testing indication indicates whether in a next frame the UE should transmit a non-test frame using only the new transmit antenna or a test frame using both the new transmit antenna and a non-selected antenna.

22. The computer-program product of claim 21, wherein the code for causing the Node B to select comprises code for causing the Node B to compare channel strength metrics of multiple transmit antennas to determine a stronger transmit antenna.

23. The computer-program product of claim 22, wherein the code for causing the Node B to select further comprises code for causing the Node B to determine the channel strength metrics by removing an effect of power control commands sent to the UE.

24. The computer-program product of claim 23, wherein the code for causing the Node B to select further comprises code for causing the Node B to average the channel strength metrics over multiple slots within a frame or over multiple frames.

25. A method for switching antennas in a closed loop transmit diversity system, comprising:
  transmitting data on an uplink during a cycle period using multiple transmit antennas;
  receiving feedback data that comprises a selected transmit antenna index, based on a new transmit antenna, and an indication about whether a next frame is a test frame, based on a new cycle period, wherein the new cycle period is a function of a correlation over time of decisions to select the new transmit antenna;
  transmitting, when the next frame is the test frame, the next frame using the new transmit antenna and a non-selected transmit antenna; and
  transmitting, when the next frame is a non-test frame, the next frame using only the new transmit antenna.

26. A wireless communication device for antenna switching in a closed loop transmit diversity system, comprising:
  a processor;
  memory in electronic communication with the processor; and
  instructions stored in the memory, the instructions being executable by the processor to:
    transmit data on an uplink during a cycle period using multiple transmit antennas;
    receive feedback data that comprises a selected transmit antenna index, based on a new transmit antenna, and an indication about whether a next frame is a test frame, based on a new cycle period, wherein the new cycle period is a function of a correlation over time of decisions to select the new transmit antenna;
    transmit, when the next frame is the test frame, the next frame using the new transmit antenna and a non-selected transmit antenna; and
    transmit, when the next frame is a non-test frame, the next frame using only the new transmit antenna.

27. A wireless communication device for switching antennas in a closed loop transmit diversity system, comprising:
  means for transmitting data on an uplink during a cycle period using multiple transmit antennas;
  means for receiving feedback data that comprises a selected transmit antenna index, based on a new transmit antenna, and an indication about whether a next frame is a test frame, based on a new cycle period, wherein the new cycle period is a function of a correlation over time of decisions to select the new transmit antenna;
  means for transmitting, when the next frame is the test frame, the next frame using the new transmit antenna and a non-selected transmit antenna; and
  means for transmitting, when the next frame is a non-test frame, the next frame using only the new transmit antenna.

28. A computer-program product for antenna switching in a closed loop transmit diversity system, the computer-program product comprising a non-transitory computer-readable medium having instructions thereon, the instructions comprising:
  code for causing a wireless communication device to transmit data on an uplink during a cycle period using multiple transmit antennas;
  code for causing the wireless communication device to receive feedback data that comprises a selected transmit antenna index, based on a new selected transmit antenna, and an indication about whether a next frame is a test frame, based on a new cycle period, wherein the new cycle period is a function of a correlation over time of decisions to select the new transmit antenna;
  code for causing the wireless communication device to transmit, when the next frame is the test frame, the next frame using the new selected transmit antenna and the non-selected transmit antenna; and
  code for causing the wireless communication device to transmit, when the next frame is a non-test frame, the next frame using only the new selected transmit antenna.

* * * * *